US008877870B2

(12) United States Patent
Funaki et al.

(10) Patent No.: US 8,877,870 B2
(45) Date of Patent: Nov. 4, 2014

(54) FLUORINATED ELASTIC COPOLYMER AND PROCESS FOR ITS PRODUCTION, AND CROSSLINKED RUBBER ARTICLE

(75) Inventors: Hiroshi Funaki, Tokyo (JP); Kunio Watanabe, Tokyo (JP); Keigo Matsuura, Tokyo (JP); Ng Soon Yeng, Haslingden (GB)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/183,852

(22) Filed: Jul. 15, 2011

(65) Prior Publication Data

US 2012/0190796 A1  Jul. 26, 2012

Related U.S. Application Data

(63) Continuation of application No. PCT/JP2010/050430, filed on Jan. 15, 2010.

(30) Foreign Application Priority Data

Jan. 16, 2009 (JP) ................................. 2009-007638

(51) Int. Cl.
C08F 214/18 (2006.01)
C08F 214/26 (2006.01)

(52) U.S. Cl.
CPC ............. *C08F 214/18* (2013.01); *C08F 214/26* (2013.01)
USPC .................. 525/326.4; 525/326.2; 525/326.3; 526/206; 526/242; 526/247; 526/250; 526/252; 526/253; 526/255

(58) Field of Classification Search
USPC ......... 525/326.4, 326.2, 326.3; 526/206, 242, 526/247, 250, 252, 253, 255
See application file for complete search history.

(56) References Cited

U.S. PATENT DOCUMENTS

| 3,114,778 | A | 12/1963 | Fritz et al. |
| 4,035,565 | A | 7/1977 | Apotheker et al. |
| 5,225,504 | A | 7/1993 | Tatsu et al. |
| 5,231,154 | A * | 7/1993 | Hung ............................ 526/206 |
| 5,264,508 | A | 11/1993 | Ishibe et al. |
| 6,310,142 | B1 * | 10/2001 | Apostolo et al. ............. 525/200 |
| 6,642,331 | B2 | 11/2003 | Apostolo et al. |
| 2011/0077371 | A1 | 3/2011 | Sato et al. |

FOREIGN PATENT DOCUMENTS

| DE | 37 10 819 | A1 | 10/1987 |
| JP | 2002-012626 | * | 1/2002 |
| WO | 90-14368 | | 11/1990 |
| WO | 97-24381 | | 7/1997 |
| WO | 2001-206864 | | 7/2001 |
| WO | 2007/145181 | | 12/2007 |
| WO | 2009/096342 | | 8/2009 |
| WO | 2009/151109 | | 12/2009 |

OTHER PUBLICATIONS

International Search Report issued Apr. 6, 2010 in PCT/JP10/050430 filed Jan. 15, 2010.
Extended European Search Report issued May 7, 2012 in Patent Application No. 10731302.5.
Office Action issued Oct. 2, 2012 in European Patent Application No. 10731302.5.
Office Action issued Oct. 5, 2012 in European Patent Application No. 10731302.5.

* cited by examiner

*Primary Examiner* — Robert C Boyle
(74) *Attorney, Agent, or Firm* — Oblon, Spivak, McClelland, Maier & Neustadt, L.L.P.

(57) ABSTRACT

A fluorinated elastic copolymer which has iodine atoms, bromine atoms, or both iodine and bromine atoms, at its molecular terminals and which includes repeating units (a) based on tetrafluoroethylene, repeating units (b) based on a fluorinated monomer having one polymerizable unsaturated bond (provided that tetrafluoroethylene is excluded), and repeating units (c) based on a fluorinated monomer having at least two polymerizable unsaturated bonds, wherein the ratio (molar ratio) of the repeating units (a) to the repeating units (b) is (a)/(b)=40/60 to 90/10, and the proportion of the repeating units (c) based on the total amount of the repeating units (a) and the repeating units (b) is from 0.01 to 1 mol %.

16 Claims, No Drawings

FLUORINATED ELASTIC COPOLYMER AND PROCESS FOR ITS PRODUCTION, AND CROSSLINKED RUBBER ARTICLE

CROSS REFERENCE TO RELATED APPLICATION

This application is a 371 of PCT/JP2010/50430, filed on Jan. 15, 2010, and claims priority to Japanese Patent Application No. 2009-007638, filed on Jan. 16, 2009.

TECHNICAL FIELD

The present invention relates to a fluorinated elastic copolymer and a process for its production, as well as a crosslinked rubber article obtainable by using such a fluorinated elastic copolymer.

BACKGROUND ART

As a fluorinated elastomer, a fluorinated elastic copolymer such as a vinylidene fluoride/hexafluoropropylene copolymer, a tetrafluoroethylene/propylene copolymer or a tetrafluoroethylene/perfluoro(alkyl vinyl ether) copolymer has been known.

Among them, a tetrafluoroethylene/perfluoro(alkyl vinyl ether) copolymer is particularly excellent in heat resistance and chemical resistance. Accordingly, various studies have been made with respect to such a tetrafluoroethylene/perfluoro(alkyl vinyl ether) copolymer (e.g. Patent Document 1).

As a process for producing a fluorinated elastic copolymer, a process is, for example, known wherein tetrafluoroethylene and a perfluoro(alkyl vinyl ether) are subjected to radical copolymerization in the presence of a diiodo compound. In this process, the diiodo compound functions as a chain transfer agent, and a fluorinated elastic copolymer obtained by such a process may be crosslinked by e.g. heating in the presence of a peroxide by utilizing iodine atoms bonded to the molecular terminals (the main chain terminals) thereby to obtain a crosslinked rubber article.

However, in such a fluorinated elastic copolymer, iodine atoms to serve as crosslinking points are bonded to the molecular terminals, whereby the molecular weight is substantially influential over the crosslinkability. For example, if the molecular weight is increased, the crosslinking point density decreases, and the crosslinkability decreases. Therefore, there has been a problem that it is difficult to produce a fluorinated elastic copolymer which has a high molecular weight and is excellent in crosslinkability.

To overcome such a problem, a method has been proposed wherein a monomer having a crosslinkable group is copolymerized to obtain a fluorinated elastic copolymer having a crosslinkable group in its side chain. For example, Patent Document 2 proposes a method wherein $I(CH_2CF_2CF_2O)_m(C(CF_3)CF_2O)_nCF=CF_2$ is copolymerized to obtain a fluorinated elastic copolymer having an iodine atom in its side chain. Patent Document 3 proposes a method wherein perfluoro(8-cyano-5-methyl-3,6-dioxa-1-octene) is copolymerized to obtain a perfluoropolymer having a cyano group in its side chain.

However, the fluorinated elastic copolymer obtainable by copolymerizing a monomer having a crosslinkable group has a problem such that the physical properties of the obtainable crosslinked rubber are unstable.

PRIOR ART DOCUMENTS

Patent Documents

Patent Document 1: U.S. Pat. No. 4,035,565
Patent Document 2: WO97/24381
Patent Document 3: WO90/14368

DISCLOSURE OF INVENTION

Technical Problem

The present invention has been made in view of the above situation, and it is an object of the present invention to provide a fluorinated elastic copolymer excellent in crosslinkability irrespective of the molecular weight and a process for its production, as well as a crosslinked rubber article.

Solution to Problem

With respect to the problem that the physical properties of a crosslinked rubber article obtained by crosslinking a fluorinated elastic copolymer obtainable by copolymerizing a monomer having a crosslinkable group, the present inventors have conducted an extensive study, whereby it is considered that one of the reasons may be such that when crosslinking points such as iodine atoms are introduced to side chains, localization of crosslinking points results and the distances between crosslinking points in the polymer molecules will be non-uniform. From such a viewpoint, a further study has been made and as a result, it has been found possible to solve the above problem by copolymerizing specific fluorinated monomers, and the present invention has been accomplished.

That is, the first embodiment of the present invention is a fluorinated elastic copolymer which has iodine atoms, bromine atoms, or both iodine and bromine atoms, at its molecular terminals and which comprises repeating units (a) based on tetrafluoroethylene, repeating units (b) based on a fluorinated monomer having one polymerizable unsaturated bond (provided that tetrafluoroethylene is excluded), and repeating units (c) based on a fluorinated monomer having at least two polymerizable unsaturated bonds, wherein the ratio (molar ratio) of the repeating units (a) to the repeating units (b) is (a)/(b)=40/60 to 90/10, and the proportion of the repeating units (c) based on the total amount of the repeating units (a) and the repeating units (b) is from 0.01 to 1 mol %.

The second embodiment of the present invention is a process for producing a fluorinated elastic copolymer, which comprises subjecting tetrafluoroethylene, a fluorinated monomer having one polymerizable unsaturated bond (provided that tetrafluoroethylene is excluded) and a fluorinated monomer having at least two polymerizable unsaturated bonds to radical copolymerization in the presence of a radical polymerization initiator and a chain transfer agent having an iodine atom, a bromine atom, or both iodine and bromine atoms, to obtain the fluorinated elastic copolymer of the above first embodiment.

The third embodiment of the present invention is a crosslinked rubber article obtained by crosslinking the fluorinated elastic copolymer of the above first embodiment.

Advantageous Effects of Invention

According to the present invention, it is possible to provide a fluorinated elastic copolymer excellent in crosslinkability irrespective of the molecular weight and a process for its production, as well as a crosslinked rubber article.

A crosslinked rubber article obtained by crosslinking the fluorinated elastic copolymer of the present invention is excellent in the heat resistance, chemical resistance, oil resistance and mechanical properties.

DESCRIPTION OF EMBODIMENTS

The fluorinated elastic copolymer of the present invention is a fluorinated elastic copolymer which has iodine atoms, bromine atoms, or both iodine and bromine atoms, at its molecular terminals and which comprises repeating units (a) based on tetrafluoroethylene (hereinafter referred to as TFE), repeating units (b) based on a fluorinated monomer having one polymerizable unsaturated bond (provided that tetrafluoroethylene is excluded) (hereinafter referred to as the fluorinated monomer 1), and repeating units (c) based on a fluorinated monomer having at least two polymerizable unsaturated bonds (hereinafter referred to as the fluorinated monomer 2). The fluorinated elastic copolymer of the present invention is preferably a fluorinated elastic copolymer wherein all of the repeating units are repeating units based on perfluorocompounds (hereinafter sometimes referred to as a perfluoroelastomer).

In the fluorinated elastic copolymer of the present invention, a plurality of branching points are present in a polymer molecular chain, as at least two polymerizable unsaturated bonds in the fluorinated monomer 2 are respectively reacted during the radical copolymerization. Therefore, a plurality of terminal points of the polymerization reaction are present which become molecular terminals, and, for example, three or more molecular terminals will be present, while the molecular terminals are only two if the molecular chain is linear. As the number of molecular terminals increases, the number of iodine atoms, bromine atoms, or both iodine and bromine atoms, functioning as crosslinking points, increases, whereby even if the molecular weight becomes large, the crosslinking point density can be secured to some extent, and as crosslinking points are present at molecular terminals i.e. not in the side chains, it is possible to prevent localization of crosslinking points, or nonuniformity in distances between the crosslinking points resulting from such localization. Therefore, the fluorinated elastic copolymer has excellent crosslinkability even when it has a high molecular weight, and the physical properties of a crosslinked rubber obtained by using such a copolymer are also good.

The polymerizable unsaturated bond in the fluorinated monomer 1 may, for example, be a double bond (C=C), or a triple bond (C≡C) between carbon atoms and is preferably a double bond. Further, the fluorinated monomer 1 is preferably a perfluorocompound.

The fluorinated monomer 1 preferably has a group containing the above polymerizable unsaturated bond at the terminal. The group containing the polymerizable unsaturated bond at the terminal is preferably $CF_2=CF-O-$ or $CF_2=CF-$, particularly preferably $CF_2=CF-O-$, whereby the reactivity in the radical copolymerization will be excellent.

A preferred fluorinated monomer 1 may, for example, be a perfluoro(alkyl vinyl ether) (hereinafter sometimes referred to as PAVE) represented by the formula $CF_2=CFOR^{f1}$ (wherein $R^{f1}$ is a perfluoroalkyl group which may have an etheric oxygen atom) or a perfluoroalkene represented by the formula $CF_2=CF-R^{f2}$ (wherein $R^{f2}$ is a perfluoroalkyl group which may have an etheric oxygen atom).

In the formulae, each of the perfluoroalkyl groups in $R^{f1}$ and $R^{f2}$ may be linear, branched or cyclic and is preferably linear or branched. The number of carbon atoms in such a perfluoroalkyl group is preferably from 1 to 20, more preferably from 1 to 10, most preferably from 1 to 3.

Such a perfluoroalkyl group may have an etheric oxygen atom (—O—). In such a case, the number of etheric oxygen atoms contained in such a perfluoroalkyl group may be 1, or 2 or more.

The perfluoroalkyl group having an etheric oxygen atom (—O—) may, for example, be a group represented by the formula $—(CF_2CFXO)_yR^{f3}$ (wherein X is F or $CF_3$, y is an integer of from 1 to 5, and $R^{f3}$ is a $C_{1-3}$ perfluoroalkyl group).

In the present invention, the fluorinated monomer 1 is preferably at least one member selected from the group consisting of hexafluoropropylene and the above PAVE, more preferably the above PAVE.

The above PAVE may, for example, be perfluoro(methyl vinyl ether) (hereinafter referred to as PMVE), perfluoro(ethyl vinyl ether) (hereinafter referred to as PEVE), perfluoro(propyl vinyl ether) (hereinafter referred to as PPVE), perfluoro(2-methoxypropyl vinyl ether), perfluoro(ethoxyethyl vinyl ether) or perfluoro(2-propoxypropyl vinyl ether). Among them, at least one member selected from the group consisting of PMVE, PEVE and PPVE is preferred; PMVE, PPVE or a mixture of PMVE and PPVE is more preferred; and PMVE is most preferred.

The polymerizable unsaturated bond in the fluorinated monomer 2 may be the same one mentioned as the polymerizable unsaturated bond in the above fluorinated monomer 1. Like the fluorinated monomer 1, the fluorinated monomer 2 is also preferably a perfluorocompound.

In the fluorinated monomer 2, the number of polymerizable unsaturated bonds is preferably from 2 to 6, more preferably 2 or 3, most preferably 2.

Further, at least two polymerizable unsaturated bonds contained in the fluorinated monomer 2 are preferably equal in the reactivity in the radical copolymerization, whereby at the time of subjecting TFE, the fluorinated monomer 1 and the fluorinated monomer 2 to radical copolymerization, the respective polymerizable unsaturated bonds contained in the fluorinated monomer 2 will react well, and the residual amount of polymerizable unsaturated bonds in the finally obtainable fluorinated elastic copolymer will be small. The smaller the residual amount, the better the effects of the present invention.

Whether or not the reactivity in the radical copolymerization is equal, can be judged from the structure. For example, if the structure (such as other atoms or groups bonded to the carbon atoms constituting the unsaturated bond, the distance from the molecular terminal to the unsaturated bond, etc.) is the same, such a structure may be said to have an equal reactivity.

The fluorinated monomer 2 preferably has at least two groups each containing the above polymerizable unsaturated bond at the terminal. The group containing the polymerizable unsaturated bond at the terminal is preferably $CF_2=CF-O-$ or $CF_2=CF-$, particularly preferably $CF_2=CF-O-$, whereby the reactivity in the radical copolymerization is excellent.

A preferred fluorinated monomer 2 may be a compound represented by the formula $R^{f4}((O)_aCF=CF_2)_b$ (wherein a is 0 or 1, b is an integer of from 2 to 6, and $R^{f4}$ is a $C_{1-25}$ b-valent perfluoro saturated hydrocarbon group).

In the formula, a is preferably 1.

b is preferably 2 or 3, most preferably 2.

The perfluoro saturated hydrocarbon group for $R^{f4}$ may be a group having b fluorine atoms removed from a $C_{1-25}$ perfluoroalkane, which may be linear, branched or cyclic, preferably linear or branched. The number of its carbon atoms is preferably from 2 to 20, more preferably from 2 to 10.

Such a perfluoro saturated hydrocarbon group may have an etheric oxygen atom (—O—). In such a case, the number of etheric oxygen atoms contained in the pefluoro saturated hydrocarbon group may be 1, or 2 or more.

In the present invention, the fluorinated monomer 2 is most preferably a compound of the above formula wherein a is 1, and b is 2. That is, the fluorinated monomer 2 is most preferably a compound represented by the formula $CF_2=CFOR^{f4}OCF=CF_2$.

Such a compound is preferably at least one member selected from the group consisting of $CF_2=CFO(CF_2)_cOCF=CF_2$ (wherein c is an integer of from 1 to 10), $CF_2=CFO[(CF_2)_dO]_f(CFX^1CF_2O)_eCF=CF_2$ (wherein d is an integer of from 1 to 10, f is 0 or an integer of from 1 to 5, e is an integer of from 1 to 5, and $X^1$ is F or $CF_3$) and $CF_2=CFO(CF_2CFX^2O)_g[(CF_2)_hO]_k(CFX^3CF_2O)_iCF=CF_2$ (wherein g is 0 or an integer of from 1 to 5, h is 0 or an integer of from 1 to 10, k is 0 or 1 (provided that when h is 0, k is also 0), i is an integer of from 1 to 5, and each of $X^2$ and $X^3$ which are independent of each other, is F or $CF_3$).

Specific examples of $CF_2=CFO(CF_2)_cOCF=CF_2$ include $CF_2=CFO(CF_2)_2OCF=CF_2$, $CF_2=CFO(CF_2)_4OCF=CF_2$, $CF_2=CFO(CF_2)_6OCF=CF_2$, $CF_2=CFO(CF_2)_8OCF=CF_2$, etc.

Specific examples of $CF_2=CFO[(CF_2)_dO]_f(CFX^1CF_2O)_eCF=CF_2$ include $CF_2=CFO(CF_2)_2OCF(CF_3)CF_2OCF=CF_2$, $CF_2=CFO(CF_2)_2O(CF(CF_3)CF_2O)_2CF=CF_2$, $CF_2=CFOCF_2O(CF_2CF_2O)_2CF=CF_2$, $CF_2=CFO(CF_2O)_3O(CF(CF_3)CF_2O)_2CF=CF_2$, etc.

Specific examples of $CF_2=CFO(CF_2CFX^2O)_g[(CF_2)_hO]_k(CFX^3CF_2O)_iCF=CF_2$ include $CF_2=CFOCF_2CF(CF_3)O(CF_2)_2OCF(CF_3)CF_2OCF=CF_2$ and $CF_2=CFOCF_2CF_2O(CF_2O)_2CF_2CF_2OCF=CF_2$.

Among them, $CF_2=CFO(CF_2)_cOCF=CF_2$ is preferred, and particularly preferred is $CF_2=CFO(CF_2)_4OCF=CF_2$ (hereinafter referred to as PBDVE).

In the fluorinated elastic copolymer of the present invention, the ratio (molar ratio) of the repeating units (a) to the repeating units (b) is (a)/(b)=40/60 to 90/10, and the proportion of the repeating units (c) based on the total amount of the repeating units (a) and the repeating units (b) is from 0.01 to 1 mol %.

(a)/(b) is preferably from 50/50 to 80/20.

The proportion of the repeating units (c) is preferably from 0.05 to 0.5 mol %, more preferably from 0.05 to 0.3 mol %.

When (a)/(b) is within the above range, the fluorinated elastic copolymer will be one having a sufficient elasticity.

Further, when the proportion of the repeating units (c) is within the above range, the crosslinkability of the fluorinated elastic copolymer is improved. Further, the physical properties, heat resistance, chemical resistance, etc. of the obtainable crosslinked rubber will be good.

The fluorinated elastic copolymer of the present invention preferably has a storage elastic modulus G' of from 50 to 700 kPa, more preferably from 100 to 650 kPa, as measured at a temperature of 100° C. with an amplitude of 0.5 degree at a frequency of 50 times/min.

The storage elastic modulus is an index for the average molecular weight, i.e. the higher the storage elastic modulus, the higher the molecular weight, and the lower the storage elastic modulus, the lower the molecular weight. When the storage elastic modulus G' is within the above range, the processability, the physical properties of the crosslinked rubber article, etc. will be good.

As a process for producing the fluorinated elastic copolymer of the present invention, a process is preferred wherein TFE, the fluorinated monomer 1 and the fluorinated monomer 2 are subjected to radical copolymerization in the presence of a radical polymerization initiator and a chain transfer agent having an iodine atom, a bromine atom, or both iodine and bromine atoms. A fluorinated elastic copolymer obtainable by such a process has iodine atoms, bromine atoms, or both iodine and bromine atoms, derived from the chain transfer agent.

In the process, the amounts of TFE, the fluorinated monomer 1 and the fluorinated monomer 2 are, respectively, set so that the (a)/(b) value and the proportion of the repeating units (c) in the finally obtainable fluorinated elastic copolymer will be within the above mentioned ranges.

TFE, the fluorinated monomer 1 and the fluorinated monomer 2 may be charged all at once at the initial stage or may be sequentially supplied to a reaction system containing the radical polymerization initiator and the chain transfer agent having an iodine atom, a bromine atom, or both iodine and bromine atoms.

Particularly, TFE and the fluorinated monomer 1 are preferably sequentially supplied depending upon the progress of the polymerization reaction while maintaining a constant polymerization pressure, from the viewpoint of the uniformity of the copolymer composition, the stability of the polymerization reaction, etc.

Whereas, the fluorinated monomer 2 may be charged all at once at the initial stage or may be sequentially supplied, but it is preferably charged all at once at the initial stage, whereby the crosslinkability of the obtainable fluorinated elastic copolymer will be further improved.

From such viewpoints, in the present invention, the radical copolymerization is preferably carried out by charging a part of TFE, a part of the fluorinated monomer 1 and all amount of the fluorinated monomer 2 at the initial stage to initiate the polymerization reaction and thereafter, sequentially adding the rest of TFE and the fluorinated monomer 1 into the reaction system along with the progress of the polymerization reaction.

The chain transfer agent is not particularly limited so long as it is one having an iodine atom, a bromine atom, or both iodine and bromine atoms, and a conventional one can be used.

In the present invention, as the chain transfer agent, it is preferred to use a diiodo compound having two iodine atoms, a monoiodo monobromo compound having one iodine atom and one bromine atom, or a mixture of a diiodo compound and a monoiodo monobromo compound. It is particularly preferred to use at least one member selected from the group consisting of a compound represented by the formula $R^{f5}I_2$ (wherein $R^{f5}$ is a polyfluoroalkylene group which may have an etheric oxygen atom) and a compound represented by the formula $R^{f6}IBr$ (wherein $R^{f6}$ is a polyfluoroalkylene group which may have an etheric oxygen atom).

The polyfluoroalkylene group for $R^{f5}$ or $R^{f6}$ is a group having some or all of hydrogen atoms of an alkylene group substituted by fluorine atoms. Each of $R^{f5}$ and $R^{f6}$ is preferably a perfluoroalkylene group which may have an etheric oxygen atom. The number of carbon atoms in the polyfluoroalkylene group (more preferably a perfluoroalkylene group) is preferably from 1 to 20, more preferably from 3 to 20, further preferably from 4 to 10, most preferably from 4 to 6.

Specific examples of the compound represented by $R^{f5}I_2$ include 1,4-diiodoperfluorobutane, 1,6-diiodoperfluorohexane, 1,8-diiodoperfluorooctane, etc.

Specific examples of the compound represented by $R^{f6}IBr$ include 1-iodo-4-bromoperfluorobutane, 1-iodo-6-bromoperfluorohexane and 1-iodo-8-bromoperfluorooctane.

The chain transfer agent is preferably 1,4-diiodoperfluorobutane, 1,6-diiodoperfluorohexane, or a mixture thereof.

At the time of the radical copolymerization, the chain transfer agent may be charged all at once at the initial stage or may be sequentially supplied. From the viewpoint of the uniformity of the molecular weight, etc., it is preferably charged all at once at the initial stage.

The amount of the chain transfer agent to be used is preferably from 0.01 to 5 mol %, more preferably from 0.05 to 1 mol %, based on the total molar amount of all monomers subjected to radical copolymerization.

As the radical polymerization initiator, it is possible to use one which has been commonly used for the preparation of a perfluoroelastomer, and it may suitably be selected depending upon the polymerization method. For example, in a case where the reaction is carried out in an aqueous medium such as water, a water-soluble radical polymerization initiator is preferably employed.

Specific examples of the water-soluble radical polymerization initiator include a persulfate such as ammonium persulfate, hydrogen peroxide, disuccinic acid peroxide, or an organic initiator such as azobisisobutylamidine dihydrochloride, etc. Further, a redox type initiator made of a combination of a persulfate or hydrogen peroxide with a reducing agent such as sodium hydrogen sulfite or sodium thiosulfate, or an inorganic initiator having a small amount of iron, a ferrous salt, silver sulfate or the like further added to such a redox type initiator, may also be used.

At the time of the radical copolymerization, the radical polymerization initiator may be charged all at once at the initial stage or may be sequentially supplied. From the viewpoint of the uniformity of the polymerization reaction, efficiency for control of the molecular weight distribution of the obtainable copolymer, etc., it is preferably sequentially supplied depending upon the progress of the polymerization reaction.

The amount of the radical polymerization initiator to be used, is preferably from 0.0001 to 3 mass %, more preferably from 0.001 to 1 mass %, based on the total mass of all monomers subjected to radical copolymerization.

A pH buffering agent may be used together with the above described chain transfer agent and radical polymerization initiator.

The pH buffering agent may, for example, be an inorganic salt (such as disodium hydrogen phosphate, sodium dihydrogen phosphate, sodium hydrogen carbonate, sodium carbonate or a hydrate thereof).

The polymerization method may, for example, be emulsion polymerization, solution polymerization or suspension polymerization.

In the present invention, it is particularly preferred to carry out the radical copolymerization by emulsion polymerization, since it is excellent in the productivity and adjustment of the molecular weight and the copolymer composition.

The production of the fluorinated elastic copolymer of the present invention by emulsion polymerization can be carried out, for example, by heating TFE, the fluorinated monomer 1 and the fluorinated monomer 2 in the presence of an aqueous medium, an emulsifier, the above mentioned chain transfer agent and radical polymerization initiator.

As the aqueous medium, water or a mixed solvent of water with a water-soluble organic solvent is preferred.

The water-soluble organic solvent may, for example, be tert-butanol, propylene glycol, dipropylene glycol, dipropylene glycol monomethyl ether or tripropylene glycol. Particularly preferred is tert-butanol or dipropylene glycol monomethyl ether.

In the mixed solvent, the proportion of the water-soluble organic solvent is preferably from 1 to 40 parts by mass, more preferably from 3 to 30 parts by mass, per 100 parts by mass of water.

As the emulsifier, an emulsifier which has been commonly used for emulsion polymerization, may be used. As the obtainable latex is excellent in mechanical and chemical stability, an ionic emulsifier is preferred, and an anionic emulsifier is more preferred.

Preferred specific examples of the anionic emulsifier include a hydrocarbon type emulsifier such as sodium lauryl sulfate or sodium dodecylbenzene sulfonate, or a fluorinated fatty acid salt such as ammonium perfluorooctanoate, sodium perfluorooctanoate or ammonium perfluorohexanoate. Further, a fluorinated emulsifier represented by the formula $F(CF_2)_pO(CF(X^3)CF_2O)_qCF(Y)COOA$ (wherein each of $X^3$ and Y which are independent of each other, is a fluorine atom or a $C_{1-3}$ perfluoroalkyl group, A is a hydrogen atom, an alkali metal atom or $NH_4$, p is an integer of from 1 to 10, and q is an integer of from 0 to 3) is also preferred. In the above A, the alkali metal atom may, for example, be sodium or potassium.

Specific examples of the fluorinated emulsifier represented by $F(CF_2)_pO(CF(X^3)CF_2O)_qCF(Y)COOA$ include $F(CF_2)_3O(CF(CF_3)CF_2O)_2CF(CF_3)COONH_4$, $F(CF_2)_3OCF(CF_3)CF_2OCF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$, $F(CF_2)_4O(CF_2CF_2O)_2CF_2COONa$, $F(CF_2)_2OCF_2CF_2OCF_2COONH_4$, $F(CF_2)_2O(CF_2CF_2O)_2CF_2COONH_4$, $F(CF_2)_2OCF_2CF_2OCF_2COONa$, $F(CF_2)_2O(CF_2CF_2O)_2CF_2COONa$, $CF_3OCF_2CF_2CF_2OCF_2COONH_4$, $CF_3OCF_2CF_2OCF(CF_3)COONH_4$, $CF_3OCF_2CF_2CF_2OCF_2COONa$, $CF_3OCF_2CF_2CF_2OCF(CF_3)COONa$, $CF_3O(CF_2O)_3CF_2COONH_4$, $CF_3O(CF_2O)_3CF_2COONa$, $CF_3OCF(CF_3)CF_2OCF(CF_3)COONH_4$, $CF_3OCF(CF_3)CF_2OCF(CF_3)COONa$, $CF_3O(CF_2CF_2O)_2CF_2COONH_4$, $CF_3O(CF_2CF_2O)_2CF_2COONa$, etc.

As the emulsifier, at least one member selected from the group consisting of ammonium perfluorooctanoate, $F(CF_2)_4OCF_2CF_2OCF_2COONH_4$, $F(CF_2)_3OCF_2CF_2OCF_2COONH_4$, $F(CF_2)_2OCF_2CF_2OCF_2COONH_4$ and $CF_3OCF_2CF_2CF_2OCF_2COONH_4$, is preferred.

At the time of emulsion polymerization, the emulsifier may be charged all at once at the initial stage or may be sequentially supplied. It is preferably charged all at once at the initial stage from the viewpoint of the stability of the polymerization reaction, the efficiency of the control of the molecular weight distribution, etc.

The amount of the emulsifier to be used, is preferably from 0.01 to 15 parts by mass, more preferably from 0.1 to 10 parts by mass, per 100 parts by mass of the aqueous medium.

The polymerization conditions such as the polymerization pressure, temperature, etc. may suitably be selected depending upon the monomer composition, the decomposition temperature of the radical polymerization initiator to be used, etc. Usually, the polymerization pressure is preferably from 0.1 to 20 MPaG, more preferably from 0.3 to 10 MPaG, most preferably from 0.3 to 5 MPaG. The polymerization temperature is preferably from 0 to 100° C., more preferably from 10 to 90° C., most preferably from 20 to 85° C.

After the above emulsion polymerization, the obtained latex may be coagulated to isolate the fluorinated elastic copolymer.

For the coagulation, it is possible to use a known method such as addition of a metal salt, addition of an inorganic acid such as hydrochloric acid or sulfuric acid, mechanical shearing or freezing/thawing.

The crosslinked rubber article of the present invention is one obtained by crosslinking the above fluorinated elastic copolymer.

As the crosslinking method, it is possible to use a conventional method which has been commonly used at the time of obtaining a crosslinked rubber from a perfluoroelastomer. For example, a method of heating the above fluorinated elastic copolymer in the presence of a crosslinking agent, or a method of applying high energy electromagnetic waves such as radiation or ultraviolet rays.

Among them, a method of heating in the presence of a crosslinking agent is preferred. The production of the crosslinked rubber of the present invention by such a method may be carried out, for example, by blending a crosslinking agent and optional additives to the above fluorinated elastic copolymer to obtain a fluorinated elastic copolymer composition, then molding the fluorinated elastic copolymer composition into a desired shape, followed by heating for crosslinking.

As the crosslinking agent, one which has been commonly used to crosslink a perfluoroelastomer may be used, and particularly preferred is an organic peroxide since it is excellent in the productivity, heat resistance and chemical resistance of a crosslinked rubber. The organic peroxide is preferably one, of which the temperature at which the half-life becomes 1 minute (the temperature for a half-life of 1 minute) is from 100 to 250° C.

Specific examples of the organic peroxide include dialkyl peroxides such as di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane and 2,5-dimethyl-2,5-di(tert-butylperoxy)hexane-3), 1,1-di(tert-butylperoxy)-3,3,5-trimethylcyclohexane, 2,5-dimethylhexane-2,5-dihydroxyperoxide, benzoyl peroxide, tert-butylperoxybenzene, 1,3-bis(tert-butylperoxyisopropyl)benzene, 2,5-dimethyl-2,5-di(benzoylperoxy)hexane, tert-butylperoxymaleic acid, and tert-butylperoxyisopropyl carbonate. Among them, a dialkyl peroxide is preferred.

The amount of the crosslinking agent to be blended is preferably from 0.3 to 10 parts by mass, more preferably from 0.3 to 5 parts by mass, most preferably from 0.5 to 3 parts by mass, per 100 parts by mass of the fluorinated elastic copolymer. Within this range, the obtainable cross-linked rubber article will be one excellent in balance of the strength and the elongation.

As an optional additive to be incorporated to the fluorinate elastic copolymer composition, preferred is a crosslinking aid. By incorporating the crosslinking aid, the crosslinking efficiency can be improved.

Specific examples of the crosslinking aid include triallyl cyanurate, triallyl isocyanurate, trimethallyl isocyanurate, 1,3,5-triacryloylhexahydro-1,3,5-triazine, triallyl trimellitate, m-phenylenediamine bismaleimide, p-quinone dioxime, p,p'-dibenzoyl quinone dioxime, dipropargyl terephthalate, diallyl phthalate, N,N',N'',N'''-tetraallyl terephthalamide, and a vinyl group-containing siloxane oligomer (such as polymethylvinylsiloxane or polymethylphenylvinylsiloxane). Among them, triallyl cyanurate, triallyl isocyanurate or trimethallyl isocyanurate is preferred, and triallyl isocyanurate is more preferred.

The amount of the crosslinking aid to be blended is preferably from 0.1 to 10 parts by mass, more preferably from 0.5 to 5 parts by mass, per 100 parts by mass of the fluorinated elastic copolymer. Within such a range, the obtainable crosslinked rubber article will be one excellent in balance of the strength and the elongation.

To the fluorinated elastic copolymer composition, a metal oxide may further be blended, as the case requires. By blending the metal oxide, the crosslinking reaction may be proceeded swiftly and certainly.

As a specific example of the metal oxide, a bivalent metal oxide such as magnesium oxide, calcium oxide, zinc oxide or lead oxide is preferred.

The amount of the metal oxide to be blended is preferably from 0.1 to 10 parts by mass, more preferably from 0.5 to 5 parts by mass, per 100 parts by mass of the fluorinated elastic copolymer. Within this range, it is possible to obtain a crosslinked rubber article excellent in balance of the strength and the elongation.

To the fluorinated elastic copolymer composition, the scorch retardant may further be blended for the purpose of adjusting the crosslinking rate.

The scorch retardant may, for example, be a phenolic hydroxy group-containing compound such as bisphenol A, bisphenol AF, phenol, cresol, p-phenylphenol, m-phenylphenol, o-phenylphenol, allylphenol, p-hydroxybenzoic acid or ethyl p-hydroxybenzoate, a quinone such as hydroquinone, hydroquinone monoethyl ether or hydroquinone monomethyl ether or an α-methylstyrene dimer such as 2,4-di(3-isopropylphenyl)-4-methyl-1-pentene, 2,4-di(4-isopropylphenyl)-4-methyl-1-pentene, 2-(3-isopropylphenyl)-4-(4-isopropylphenyl)-4-methyl-1-pentene, 2-(4-isopropylphenyl)-4-(3-isopropylphenyl)-4-methyl-1-pentene, 2,4-di(3-methylphenyl)-4-methyl-1-pentene, 2,4-di(4-methylphenyl)-4-methyl-1-pentene or 2,4-diphenyl-4-methyl-1-pentene.

The amount of the scorch retardant to be blended is preferably from 0.05 to 3 parts by mass, more preferably from 0.05 to 1 part by mass, per 100 parts by mass of the fluorinated elastic copolymer.

To the fluorinated elastic copolymer composition, as additives other than those mentioned above, optional additives which have been commonly employed for the production of crosslinked rubber articles may further be blended. As such additives, a coloring pigment, a filler, a reinforcing agent, etc. may for example be mentioned.

Specific examples of such additives include carbon black, titanium oxide, silicon dioxide, clay, talc, polytetrafluoroethylene, polyvinylidene fluoride, polyvinyl fluoride, polychlorotrifluoroethylene, a TFE/ethylene copolymer, a TFE/propylene copolymer, a TFE/vinylidene fluoride copolymer, etc.

The conditions for molding the fluorinated elastic copolymer composition are not particularly limited and may be suitably set depending upon the crosslinking method, etc. For example, in a case where an organic peroxide is contained as a crosslinking agent, the temperature and the time may be adjusted depending upon the temperature for a half-life of 1 minute of the blended organic peroxide. Usually, primary crosslinking is carried out at a temperature of from 150 to 200° C. for from 1 to 20 minutes, and then, secondary crosslinking is carried out at a temperature of from 200 to 300° C. for from 1 to 24 hours. In such a case, it is common that the primary crosslinking is carried out under pressure by means of a mold, and the secondary crosslinking is carried out after taking the product out from the mold. It is also preferred that these crosslinking reactions are carried out in vacuum or in an inert gas atmosphere.

The fluorinated elastic copolymer of the present invention is a perfluoroelastomer excellent in crosslinkability even when made to have a high molecular weight, and the crosslinked rubber article of the present invention obtained by using such a fluorinated elastic copolymer has good physical properties, etc., and is excellent also in the stability of the physical properties, and its heat resistance and chemical resistance are also good.

Therefore, the fluorinated elastic copolymer and the crosslinked rubber article of the present invention are applicable to various applications. They are useful particularly in the fields of sealing materials for the etching step or the ashing step in the production of semiconductors, sealing materials in a step of handling a strongly acidic reagent such as hydrofluoric acid and sealing materials in a step of handling a strongly basic reagent in e.g. a process for producing glass for liquid crystal displays.

A specific shape of the crosslinked rubber article may, for example, be a ring, a seal, a packing, a gasket, a valve, a tube, a hose, a roll, a sheet or a connector. A specific example of the cross sectional shape of a ring, a seal or a packing may be a square, O-shaped, ferrule-shaped, or an odd-shaped such as D-shaped, L-shaped, T-shaped, V-shaped, X-shaped or Y-shaped.

EXAMPLES

Now, the present invention will be described in detail with reference to Examples, but it should be understood that the present invention is by no means limited thereto.

Measuring methods employed in the respective Examples and Comparative Examples are as follows.

[Method for Measuring Composition of Fluorinated Elastic Copolymer]

Measured by the $^{19}$F-NMR analysis of the fluorinated elastic copolymer.

[Method for Measuring Storage Elastic Modulus G' of Fluorinated Elastic Copolymer]

A value measured by means of RPA2000 manufactured by Alpha Technologies at a temperature of 100° C. with an amplitude of 0.5 degree at a frequency of 50 times/min in accordance with ASTM D5289 and D6204, was taken as a storage elastic modulus.

[Method for Measuring Compression Set (Evaluation of Crosslinkability)]

100 Parts by mass of a fluorinated elastic copolymer, 4 parts by mass of carbon black, 6 parts by mass of a triallyl isocyanurate 60 mass % product and 1 part by mass of 2,5-dimethyl-2,5-di(tert-butylperoxy)hexane (PERHEXA 25B manufactured by NOF Corporation) were kneaded by a twin roll mill to obtain a fluorinated elastic copolymer composition. The fluorinated elastic copolymer composition was subjected to hot pressing at 170° C. for 20 minutes and then to secondary crosslinking for 16 hours in an oven of 250° C. to prepare a cylindrical test piece having a diameter of 29.0 mm and a thickness of 12.7 mm.

With respect to the test piece, the compression set (%) when held at 200° C. for 70 hours was measured in accordance with JIS K6301. The smaller the value of the compression set, the better the recovery property of the crosslinked rubber i.e. the better the crosslinking.

[Method for Measuring Other Physical Properties]

The fluorinated elastic copolymer composition obtained in the above [METHOD FOR EVALUATING CROSSLINKABILITY] was subjected to hot pressing at 170° C. for 20 minutes and then to secondary crosslinking for 16 hours in an oven of 250° C. to obtain a crosslinked rubber sheet having a thickness of 2 mm. Such a crosslinked rubber sheet was punched out by No. 3 dumbbell to prepare a sample.

With respect to the sample, the tensile strength (MPa) and the elongation at breakage (%) were measured in accordance with JIS K6251. Further, in accordance with JIS K6235, a durometer hardness test was carried out by means of type A durometer to measure the hardness (Shore-A).

Example 1

A stainless steel pressure reactor having an internal capacity of 20 L and equipped with an anchor blade was deaerated, and then, 8,800 g of deionized water, 220 g of F(CF$_2$)$_2$OCF$_2$CF$_2$OCF$_2$COONH$_4$ and 0.64 g of disodium hydrogen phosphate dodecahydrate were charged, whereupon the gas phase was replaced with nitrogen. While stirring was carried out at a rate of 375 rpm by means of the anchor blade, the internal temperature was raised to 80° C. After the internal temperature became 80° C., a preliminarily prepared mixture of TFE/PMVE/PBDVE=25/75/0.42 (molar ratio) was injected until the internal pressure of the reactor became 0.8 MPaG. 25 mL of an aqueous solution containing 2.5 mass % of ammonium persulfate was added to initiate the polymerization.

As the polymerization proceeded, the internal pressure of the reactor decreased. Therefore, at the time when the internal pressure decreased to 0.79 MPaG, TFE gas was injected under its own pressure to raise the internal pressure of the reactor to 0.81 MPaG. This operation was repeated, and the polymerization reaction was continued while the internal pressure of the reactor was maintained between 0.79 and 0.81 MPaG. When the amount of the TFE gas added became 30 g, 8 g of I(CF$_2$)$_4$I was added by nitrogen back pressure. During this period, every time when 80 g of the TFE gas was added, 50 mL of a mixture of 3,000 g of PMVE and 38.7 g of PBDVE prepared in a separate stainless steel pressure container was injected into the reactor by nitrogen back pressure. Injection of the mixture of PMVE and PBDVE was continued until 1,120 g of the TFE gas was added.

When the total amount of TFE gas added after the addition of the aqueous ammonium persulfate solution became 1,200 g, the addition of the TFE gas was stopped, and the internal temperature of the reactor was cooled to 10° C. to stop the polymerization reaction, whereby 9,900 g of a latex of fluorinated elastic copolymer 1 was obtained. The polymerization time was about 10 hours.

5,000 g of the latex was added to 7,500 g of an aqueous solution containing 5 mass % of aluminum potassium sulfate to coagulate the latex to obtain the fluorinated elastic copolymer 1. The precipitated fluorinated elastic copolymer 1 was separated, washed six times with ultrapure water of 5,000 g each time and dried in a vacuum oven of 50° C. for 12 hours to obtain 1,142 g of white colored fluorinated elastic copolymer 1.

With respect to the fluorinated elastic copolymer 1, measurements of the composition, storage elastic modulus G', compression set and physical properties were carried out by the above described measuring methods.

According to the results, the composition of the fluorinated elastic copolymer 1 was repeating units based on TFE/repeating units based on PMVE/repeating units based on PBDVE=76.0/24.0/0.1 (molar ratio), and the storage elastic modulus G' was 614 kPa. Further, unreacted unsaturated bonds derived from PBDVE were not detected by the $^{19}$F-

NMR analysis, whereby it was assumed that unsaturated bonds of PBDVE were all consumed by the polymerization reaction.

The results of measuring the compression set and physical properties are shown in Table 1.

Example 2

A stainless steel pressure reactor having an internal capacity of 20 L and equipped with an anchor blade was deaerated, and then, 8,800 g of deionized water, 220 g of F(CF$_2$)$_2$OCF$_2$CF$_2$OCF$_2$COONH$_4$, 0.64 g of disodium hydrogen phosphate dodecahydrate and 9 g of PBDVE were charged, whereupon the gas phase was replaced with nitrogen. While stirring was carried out at a rate of 375 rpm by means of the anchor blade, 563 g of PMVE and 115 g of TFE were charged, and the internal temperature was raised to 80° C. The internal pressure showed 0.90 MPaG. 25 mL of an aqueous solution containing 2.5 mass % of ammonium persulfate was added to initiate the polymerization.

As the polymerization proceeded, the internal pressure of the reactor decreased. Therefore, at the time when the internal pressure decreased to 0.89 MPaG, TFE gas was injected under its own pressure, and the internal pressure of the reactor was raised to 0.91 MPaG. This operation was repeated, and the polymerization reaction was continued while the internal pressure of the reactor was maintained between 0.89 and 0.91 MPaG. When the amount of the TFE gas added became 30 g, 8 g of I(CF$_2$)$_4$I was added by nitrogen back pressure. During this period, every time when 80 g of the TFE gas was added, 70.5 g of PMVE prepared in a separate stainless steel pressure container was injected by nitrogen back pressure. The injection of PMVE was continued until 1,120 g of the TFE gas was added. The amount of PMVE added from the initiation of the polymerization was 987 g in total.

When the total amount of TFE gas added after the addition of the aqueous ammonium persulfate solution became 1,200 g, addition of the TFE gas was stopped, and the internal temperature of the reactor was cooled to 10° C. to stop the polymerization reaction, whereby 9,800 g of a latex of a fluorinated elastic copolymer 1 was obtained. The polymerization time was about 9.5 hours.

While 5,000 g of the latex was stirred, 50 g of 96% sulfuric acid was added to coagulate the latex to obtain a fluorinated elastic copolymer 2. The precipitated fluorinated elastic copolymer 2 was separated and washed 10 times by ultrapure water of 5,000 g each time and dried in a vacuum oven of 50° C. for 12 hours to obtain 1,106 g of white colored fluorinated elastic copolymer 2.

With respect to the fluorinated elastic copolymer 2, measurements of the composition, the storage elastic modulus G', compression set and physical properties were carried out by the above described measuring methods.

According to the results, the composition of the fluorinated elastic copolymer 2 was repeating units based on TFE/repeating units based on PMVE/repeating units based on PBDVE=76.0/24.0/0.05 (molar ratio), and the storage elastic modulus G' was 493 kPa. Further, unreacted unsaturated bonds derived from PBDVE were not detected by the $^{19}$F-NMR analysis, whereby it was assumed that unsaturated bonds of PBDVE were all consumed by the polymerization reaction.

The results of measuring the compression set and other physical properties are shown in Table 1.

Comparative Example 1

The same reactor as used in Example 1 was deaerated, and then, 8,800 g of deionized water, 220 g of F(CF$_2$)$_2$OCF$_2$CF$_2$OCF$_2$COONH$_4$ and 0.64 g of disodium hydrogen phosphate dodecahydrate were charged, whereupon the gas phase was replaced with nitrogen. While stirring was carried out at a rate of 375 rpm by means of the anchor blade, the internal temperature was raised to 80° C. After the internal temperature became 80° C., a preliminarily prepared mixed gas of TFE/PMVE=25/75 (molar ratio) was injected until the internal pressure of the reactor became 0.8 MPaG. 25 mL of an aqueous solution containing 2.5 mass % of ammonium persulfate was added to initiate the polymerization.

As the polymerization proceeded, the internal pressure of the reactor decreased. Therefore, at the time when the internal pressure decreased to 0.79 MPaG, TFE gas was injected under its own pressure, and the internal pressure of the reactor was raised to 0.81 MPaG. This operation was repeated, and the polymerization reaction was continued while the internal pressure of the reactor was maintained between 0.79 and 0.81 MPaG. When the amount of the TFE gas added became 30 g, 8 g of I(CF$_2$)$_4$I was added by nitrogen back pressure. During this period, every time when 80 g of the TFE gas was added, 50 mL of PMVE prepared in a separate stainless steel pressure container was injected to the reactor by nitrogen back pressure. The injection of PMVE was continued until 1,120 g of the TFE gas was added.

When the total amount of TFE gas added after the addition of the aqueous ammonium persulfate solution became 1,200 g, addition of the TFE gas was stopped, and the internal temperature of the reactor was cooled to 10° C. to stop the polymerization reaction, whereby 9,940 g of a latex of a fluorinated elastic copolymer 3 was obtained. The polymerization time was about 12 hours.

5,000 g of the latex was added to 7,500 g of an aqueous solution containing 5 mass % of aluminum potassium sulfate, to coagulate the latex thereby to obtain a fluorinated elastic copolymer 3. The precipitated fluorinated elastic copolymer 3 was separated and washed six times by ultrapure water of 5,000 g each time and dried in a vacuum oven of 50° C. for 12 hours to obtain 1,034 g of white colored fluorinated elastic copolymer 3.

With respect to the fluorinated elastic copolymer 3, measurements of the composition, the storage elastic modulus G', compression set and physical properties were carried out by the above described measuring methods.

According to the results, the composition of the fluorinated elastic copolymer 3 was repeating units based on TFE/repeating units based on PMVE=69.0/31.0 (molar ratio), and the storage elastic modulus G' was 540 kPa.

The results of measuring the compression set and physical properties are shown in Table 1.

TABLE 1

|  | Ex. 1 | Ex. 2 | Comp. Ex. 1 |
|---|---|---|---|
| Storage elastic modulus G' [kPa] | 614 | 493 | 540 |
| Compression set [%] (200° C. × 70 hrs) | 25 | 23 | 43 |
| Hardness (Shore-A) | 70 | 68 | 74 |
| Tensile strength [MPa] | 21 | 20 | 19 |
| Elongation at breakage [%] | 140 | 160 | 180 |

As shown by the above results, the fluorinated elastic copolymers 1 and 2 in Examples 1 and 2 had sufficient storage elastic moduli. Further, with the fluorinated elastic copolymers 1 and 2, even if the storage elastic moduli as indices for the molecular weights were, respectively, different, each of the compression sets of the obtained crosslinked rubbers showed a small value, whereby it was confirmed that they have excellent crosslinkability irrespective of the molecular weights. Further, the crosslinked rubbers had sufficiently good physical properties such as the hardness, tensile strength and elongation at breakage.

On the other hand, the fluorinated elastic copolymer 3 obtained in Comparative Example 1 was poor in crosslinkability, and a crosslinked rubber thereby obtained had a large compression set.

What is claimed is:

1. A fluorinated elastic copolymer,
which comprises repeating units (a) of tetrafluoroethylene, repeating units (b) of a fluorinated monomer having one polymerizable unsaturated bond, provided that tetrafluoroethylene is excluded, and repeating units (c) of a fluorinated monomer having at least two polymerizable unsaturated bonds,
wherein the ratio (molar ratio) of the repeating units (a) to the repeating units (b) is (a)/(b)=63.4/36.6 to 80/20, and the proportion of the repeating units (c) of the total amount of the repeating units (a) and the repeating units (b) is from 0.01 to 1 mol %,
wherein the fluorinated elastic copolymer comprises iodine atoms, bromine atoms or both iodine and bromine atoms at molecular terminals thereof,
wherein the fluorinated monomer having one polymerizable unsaturated bond is a perfluoro(alkyl vinyl ether) represented by the formula $CF_2=CFOR^{f1}$, where $R^{f1}$ is a $C_{1-3}$ perfluoroalkyl group which may have an etheric oxygen atom, and
wherein the fluorinated monomer having at least two polymerizable unsaturated bonds is a monomer represented by the formula $R^{14}((O)_aCF=CF_2)_b$, where a is 0 or 1, b is an integer of from 2 to 6, and $R^{14}$ is a $C_{1-25}$ b-valent perfluoro saturated hydrocarbon group which may have an etheric oxygen atom.

2. The fluorinated elastic copolymer according to claim 1, wherein the fluorinated monomer having at least two polymerizable unsaturated bonds is at least one member selected from the group consisting of $CF_2=CFO(CF_2)_cOCF=CF_2$, $CF_2=CFO[(CF_2)O_d]_f(CFX^1CF_2O)_eCF=CF_2$, and $CF_2=CFO(CF_2CFX^2O)_g[(CF_2)_hO]_k(CFX^3CF_2O)_iCF=CF_2$,
wherein:
c is an integer of from 1 to 10,
d is an integer of from 1 to 10, f is 0 or an integer of from 1 to 5, e is an integer of from 1 to 5, and $X^1$ is F or $CF_3$,
g is 0 or an integer of from 1 to 5, h is 0 or an integer of from 1 to 10, k is 0 or 1, and
i is an integer of from 1 to 5, and each of $X^2$ and $X^3$ which are independent of each other, is F or $CF_3$.

3. The fluorinated elastic copolymer according to claim 1, wherein the fluorinated monomer having at least two polymerizable unsaturated bonds is $CF_2=CFO(CF_2)_4OCF=CF_2$.

4. The fluorinated elastic copolymer according to claim 1, wherein the proportion of the repeating units (c) is from 0.05 to 0.5 mol %.

5. The fluorinated elastic copolymer according to claim 1, wherein the proportion of the repeating units (c) is from 0.05 to 0.3 mol %.

6. The fluorinated elastic copolymer according to claim 1, wherein the fluorinated elastic copolymer of the present invention preferably has a storage elastic modulus G' of from 50 to 700 kPa, as measured at a temperature of 100° C. with an amplitude of 0.5 degree at a frequency of 50 times/min.

7. The fluorinated elastic copolymer according to claim 1, wherein the fluorinated elastic copolymer of the present invention preferably has a storage elastic modulus G' of from 100 to 650 kPa, as measured at a temperature of 100° C. with an amplitude of 0.5 degree at a frequency of 50 times/min.

8. The fluorinated elastic copolymer according to claim 1, wherein the fluorinated elastic copolymer comprises bromine atoms or both iodine and bromine atoms at molecular terminals thereof.

9. The fluorinated elastic copolymer according to claim 1, wherein the fluorinated elastic copolymer comprises bromine atoms at molecular terminals thereof.

10. The fluorinated elastic copolymer according to claim 1, wherein the perfluoro(alkyl vinyl ether) represented by the formula $CF_2=CFOR^{f1}$ is perfluoro(methyl vinyl ether), perfluoro(ethyl vinyl ether), or perfluoro(propyl vinyl ether).

11. The fluorinated elastic copolymer according to claim 1, wherein the fluorinated monomer having at least two polymerizable unsaturated bonds is a monomer represented by the formula $CF_2=CFO(CF_2)_cOCF=CF_2$, where c is an integer of from 1 to 10.

12. A process for producing a fluorinated elastic copolymer according to claim 1, which comprises reacting tetrafluoroethylene, a fluorinated monomer having one polymerizable unsaturated bond, provided that tetrafluoroethylene is excluded, and a fluorinated monomer having at least two polymerizable unsaturated bonds to radical copolymerization in the presence of a radical polymerization initiator and a chain transfer agent having an iodine atom, a bromine atom, or both iodine and bromine atoms, to obtain the fluorinated elastic copolymer.

13. The process for producing a fluorinated elastic copolymer according to claim 12, wherein the chain transfer agent is at least one member selected from the group consisting of a compound represented by the formula $R^{f5}I_2$ and a compound represented by the formula $R^{f6}IBr$,
wherein
$R^{f5}$ is a polyfluoroalkylene group which may have an etheric oxygen atom, and
$R^{f6}$ is a polyfluoroalkylene group which may have an etheric oxygen atom.

14. The process for producing a fluorinated elastic copolymer according to claim 12, wherein the chain transfer agent is 1,4-diiodoperfluorobutane, 1,6-diiodoperfluorohexane or a mixture thereof.

15. The process for producing a fluorinated elastic copolymer according claim 12, wherein the radical copolymerization is carried out by emulsion polymerization.

16. A crosslinked rubber article obtained by crosslinking the fluorinated elastic copolymer as defined in claim 1.

* * * * *